United States Patent [19]

Imoto et al.

[11] Patent Number: 5,190,364
[45] Date of Patent: Mar. 2, 1993

[54] OPTICAL STAR COUPLER AND METHOD FOR MANUFACTURING THE SAME

[75] Inventors: Katsuyuki Imoto, Sayama; Hiroyuki Kunugiyama, Hitachi, both of Japan

[73] Assignee: Hitachi Cable Ltd., Tokyo, Japan

[21] Appl. No.: 132,888

[22] Filed: Dec. 14, 1987

[51] Int. Cl.⁵ .............................................. G02B 6/28
[52] U.S. Cl. ......................................... 385/24; 385/15
[58] Field of Search ......................... 350/96.15, 96.16

[56] References Cited

U.S. PATENT DOCUMENTS 4,449,781  5/1984  Lightstone et al. .............. 350/96.16

Primary Examiner—William L. Sikes
Assistant Examiner—Robert E. Wise

[57] ABSTRACT

An optical star coupler comprises an optical fiber bundle consisting of a plurality of optical fibers. The central portion of the optical fiber bundle is twisted, fused and pulled under heating so as to form a tapered region, and the outer peripheral portion of the tapered region is coated with a dielectric substance.

15 Claims, 2 Drawing Sheets

OPTICAL STAR COUPLER AND METHOD FOR MANUFACTURING THE SAME

BACKGROUND OF THE INVENTION

The present invention relates to an optical power divider for dividing an optical signal which is transmitted through an optical fiber among a plurality of optical fibers and a method for manufacturing the optical power divider.

With a rapid progress of fiber optic transmission technology, optical data links which use optical fibers for transmitting data between a computer and a computer or between a computer and a terminal have been researched ardently and developed more and more. In the structure of such optical data links, an optical star coupler which is capable of mixing optical signals supplied from a plurality of inputting optical fibers and dividing the mixed optical signals among a plurality of outputting optical fibers equally and with a small loss is an essential device.

One of such devices is disclosed, for example, in U.S. Pat. No. 4,439,221 "METHOD FOR MAKING OPTICAL FIBER COUPLERS" by Smith et al.

In this device, a multiplicity of optical fibers are bundled, twisted under heating, pulled and fused so as to form a tapered region at the central portion of the bundle. This structure enables an optical signal input from one end of an optical fiber to be divided among the other ends of a plurality of optical fibers. In this kind of optical star coupler, however, the tapered region has a very small outer diameter. For example, if the number of optical fibers is several, the outer diameter of the tapered region is several ten $\mu m$ to one hundred and several ten $\mu m$, and even if the number of optical fibers is about one hundred, the outer diameter of the tapered region is only several hundred $\mu m$. For this reason, the tapered region is apt to be broken during operation and such an optical star coupler is disadvantageously difficult to handle.

Furthermore, it has been found that when the tapered region which has been processed is put into a practical system as it is, the surface of the tapered region is gradually eroded by the alkaline metal and earth metal ions or the like contained in the air, so that the mechanical strength as well as the optical properties of the system is deteriorated. In addition, the optical properties of the system are deteriorated due to the adhesion of the OH ions, transition metal ions, dust, etc. in the air, and when mechanical vibration is applied to the system, the optical properties are varied due to the above-described adhesion.

SUMMARY OF THE INVENTION

Accordingly, it is an object of the present invention to provide an optical star coupler which is capable of solving the above-described problems in the prior art and a method for manufacturing the optical star coupler. More particularly, it is an object of the present invention to provide an optical star coupler which has good optical properties and high mechanical strength and which is easy to handle, and a method of manufacturing the optical star coupler.

To achieve this aim, an optical star coupler according to the present invention is manufactured by blowing a gas containing a dielectric substance (e.g., glass) material to the heated portion of an optical fiber bundle while twisting, fusing and pulling the optical fiber bundle under heating, or supplying a gas containing a dielectric substance (e.g., glass) material to an oxyhydrogen burner together with oxygen and hydrogen for producing a flame containing fine particles of a dielectric substance (e.g., glass) by a flame hydrolysis process and blowing the flame to the optical fiber bundle. Alternatively, an optical star coupler according to the present invention is manufactured by wetting the tapered region of an optical fiber bundle with a polymeric liquid (e.g., an ultraviolet curing resin) and heat setting the wet tapered region. In this manner, the outer peripheral surface of the optical fiber bundle is covered with the dielectric substance (e.g., glass, silicone resin, a polymeric material such as an ultraviolet curing resin) while the optical fiber bundle is twisted, fused and pulled. Consequently, the tapered region has a larger outer diameter than that in the prior art, and is reinforced and protected by the dielectric substance. Thus, the optical star coupler of the present invention possesses increased mechanical strength and improved optical properties.

Concerning the enhancement of mechanical strength, U.S. Ser. No. 772,914, now U.S. Pat. No. 4,726,643 (filed on Sep. 5, 1985) "OPTICAL STAR COUPLER AND METHOD FOR MANUFACTURING THE SAME" by Imoto et al. discloses a method of filling up a tube with a resin or a liquid. In the present invention, however, the tube is not filled up with a resin or the like, but the outer peripheral surface of the optical fiber bundle in the tube is covered with a dielectric substance, and this is effective for stabilization of the optical properties, increase in mechanical strength and reduction in weight.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
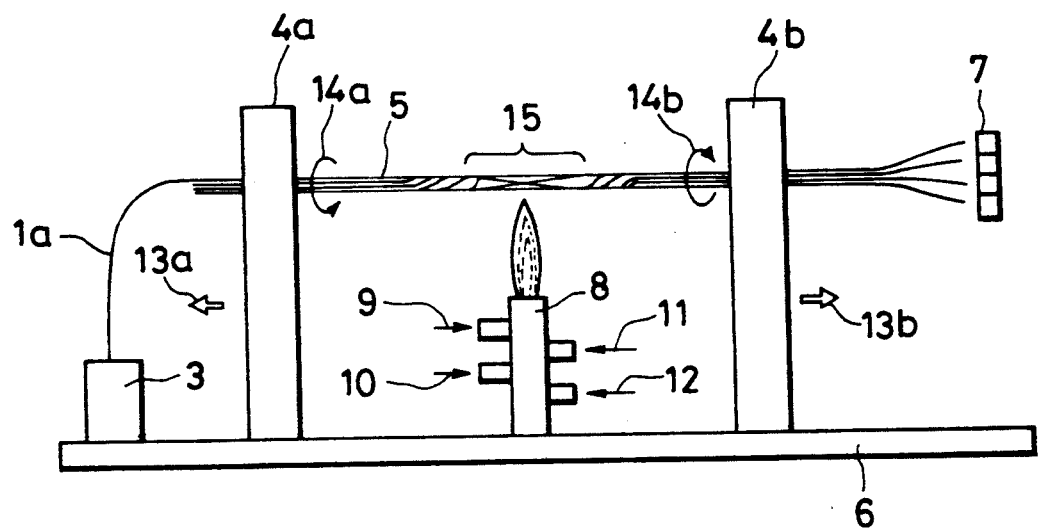
FIGS. 1, 2 and 3 are respectively explanatory views of embodiments of a method for manufacturing an optical star coupler according to the present invention.

Referring first to FIG. 1, an embodiment of a method of manufacturing an optical star coupler according to the present invention is shown. In this embodiment, glass is used as a dielectric substance. The optical star coupler in this embodiment is a 4:4 port type optical power divider in which the numbers of inputting and outputting ports are both 4. The reference numeral 6 denotes a base, 4a and 4b spindle stocks having mechanisms for holding an optical fiber bundle 5 and rotating it in the directions indicated by the arrows 14a and 14b, respectively, and mechanism for pulling it in the directions indicated by the arrows 13a and 13b, respectively. The reference numeral 3 represents a light source for causing light to enter one end of a given optical fiber of the optical fiber bundle 5. The reference numeral 7 denotes a photo diode detector for detecting the light intensity at the emission end of an optical fiber. A burner 8 has a concentric quadruplex tube nozzle structure in this embodiment. A gaseous glass material is supplied to the center nozzle, as indicated by the arrow 12, Ar gas is supplied to a first nozzle provided around the center nozzle, as indicated by the arrow 10, $H_2$ gas is supplied to a second nozzle provided around the first nozzle, as indicated by the arrow 11, and $O_2$ gas is supplied to the outermost nozzle, as indicated by the arrow 9. In this embodiment, $SiCl_4$ is supplied as the gaseous glass material on an Ar carrier gas. In order to manufacture this optical star coupler, the optical fiber bundle 5 is first rotated in the directions indicated by the arrows 14a and 14b so as to be twisted several times. An oxyhydrogen flame containing the gaseous glass material is then produced, and the central portion of the optical fiber bundle is heated by the flame. The optical fiber bundle softened by heating is pulled in the directions indicated by the arrows 13a and 13b while being further twisted in the above-described way. When the light intensities at the emission ends of the optical fibers become substantially equal, the twisting and pulling operations are stopped and the flame of the burner is extinguished. Since the outer peripheral surface of the twisted, fused and pulled portion is covered with glass, the outer diameter of this portion is not so small as that in the prior art. The glass cover serves to reinforce and protect the optical fiber bundle and stabilize the optical properties thereof. Even a thin glass cover like a film is also effective. As the gaseous glass material, a silicon compound consisting of a halide, an alkylate or a hydride and a silicon compound containing a compound for controlling a refractive index are usable. For example, not only $SiCl_4$ but also $Si(OC_2H_5)_4$, $Si(OCH_3)_4$, $SiH_4$ and a silicon compound containing a dopant added for controlling a refractive index such as $GeCl_4$, $POCl_3$ and $B(OC_2H_5)_3$ are usable.

Figure 2:
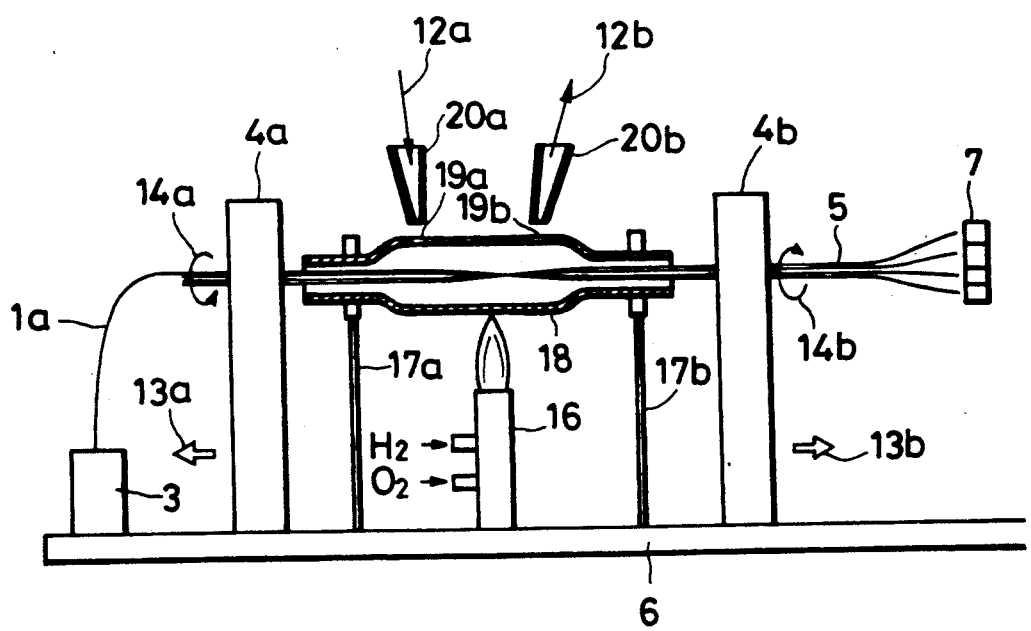

FIG. 2 shows another embodiment of a method of manufacturing an optical star coupler according to the present invention. The optical fiber bundle 5 is inserted in a glass tube 18, which is heated with an oxyhydrogen burner 16 to soften the optical fiber bundle 5 in the glass tube 18, and the softened optical fiber bundle 5 is twisted, fused and pulled. The reference numerals 17a and 17b denote a holding device for holding the glass tube 18. Holes 19a and 19b are formed in the glass tube 18 so as to introduce the gaseous glass material supplied into a nozzle 20a in the direction indicated by the arrow 12a from the hole 19a and discharge it from the hole 19b. The discharged gas is passed through a nozzle 20b in the direction indicated by the arrow 12b. If a glass container having a U-shaped, V-shaped or a semicircle cross section is used in place of the glass tube 18 and the gaseous glass material is blown from the opening of the vessel, the formation of a glass film on the tapered region is facilitated. The glass film preferably has a refractive index the same as or smaller than the refractive index of the clad portion of the optical fiber.

Figure 3:
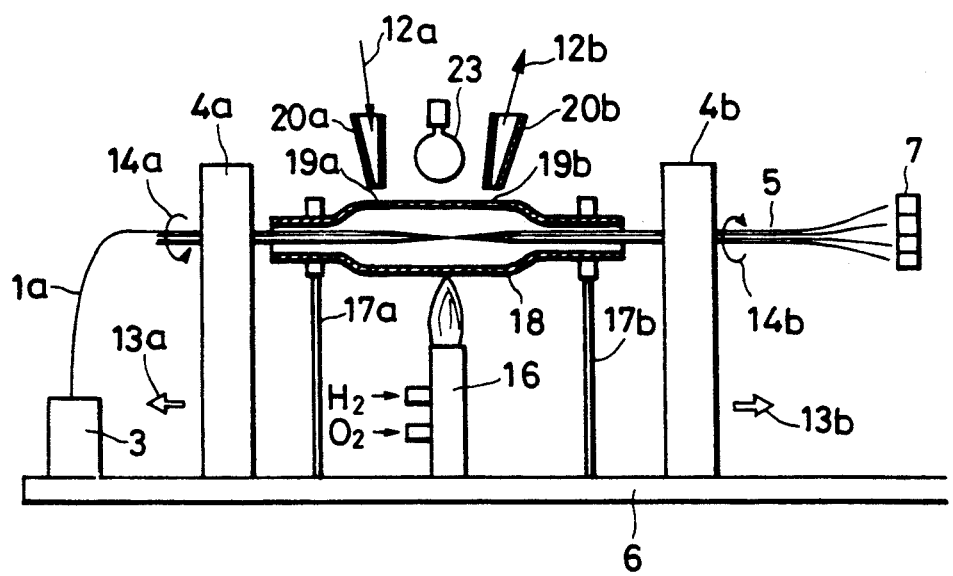

A method of forming a film by wetting the tapered region with a polymeric liquid and heat setting the wet tapered region will now be explained. In FIG. 3, after the twisted, fused and pulled portion of the optical fiber bundle 5 is formed in the silica glass tube 18, a liquid ultraviolet curing resin is inserted into the silica glass tube 18 through the hole 19a (or 19b) and the twisted, fused and pulled portion is dipped in the liquid for a predetermined time. Thereafter, the silica glass tube 18 is rotated by 180 degrees to discharge the liquid in the tube from the holes 19a and 19b. After the discharge of the liquid, the portion of the optical fiber bundle 5 which has been immersed in the liquid is irradiated with ultraviolet rays by a heat energy source, namely, an ultraviolet-light irradiation device 23. As a result, the film of the ultraviolet curing resin is formed on the outer periphery of the twisted, fused and pulled portion. As the ultraviolet curing resin, a resin having a refractive index of 1.38 to 1.40 at a wavelength of 0.85 $\mu$m is used. The film thickness of the resin can be varied by varying the time for immersing the twisted, fused and pulled portion in the liquid. A film of zero point several $\mu$m to several $\mu$m thick is formed by one dipping. In order to form a thick film, the dipping operation is repeated several times to make a multi-layered film. When the film thickness is not more than 6 $\mu$m and is uniform, the increase in loss due to the resin coating is not more than 0.5 dB. However, if the film thickness is not uniform, the increase in loss is 1 to 4 dB in spite of the same thickness. A preferable method adopted in order to form a uniform film, is a method of sealing both ends of the tube 18 with an adhesive after the optical fiber bundle 5 is twisted, fused and pulled while keeping the atmosphere clean by supplying a gas such as $N_2$ or $O_2$ into the silica glass tube 18 through the hole 19a (or 19b), and charging the liquid into the tube 18 immediately after sealing the tube 18. If the film is too thick, the loss is increased due to the light absorption loss in the resin. The preferable thickness is about several $\mu$m. By the greater degrees the refractive index of the resin is lower than the refractive index of the core and clad of an optical fiber, the larger is the amount of optical power transmitted through the core and the clad of the optical fiber, so that the loss is unlikely to increase even if the thickness of the resin is increased. In the case of using an ultraviolet curing resin, the glass tube is preferably filled with an inert gas. In the case of using a silicone resin, the glass tube is preferably evacuated for defoaming the resin after coating the twisted, fused and pulled portion with the resin. If the resin is not defoamed, there is a danger of the loss being increased by temperature cycles or an optical fiber being broken.

Figure 4:
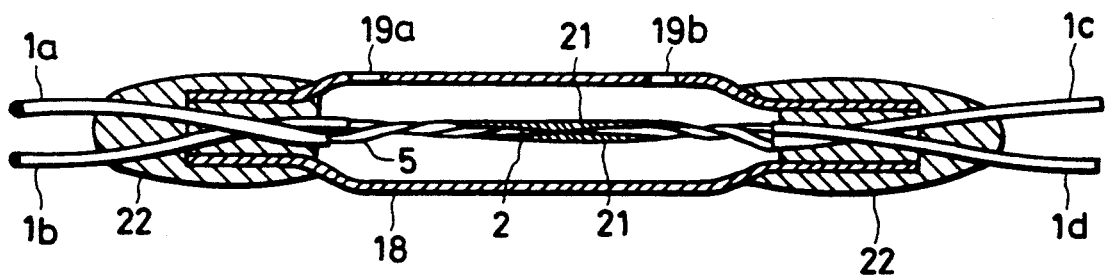
FIG. 4 shows an embodiment of an optical star coupler according to the present invention.

FIG. 4 shows an embodiment of an optical star coupler according to the present invention. This is an example of a 2:2 port type. The reference numerals 1a and 1b represent input port fibers, 1c and 1d output port fibers, and 21 a glass film which covers the outer peripheral portion of a tapered region 2. The reference numeral 22 denotes a sealing adhesive for fixing the optical fiber bundle in the glass tube 18.

The present invention is not limited to the above-described embodiments. For instance, a multiplicity of burners (including a ring burner) may be used in the embodiments shown in FIGS. 1 to 3 in place of the one burner 8 or 16. The optical fiber may be any of a quartz system, a compound system, and a plastic fiber. The glass tube 18 may be a Vycor glass tube and a compound system glass tube as well as a silica glass tube. A glass tube containing a dopant for controlling a refractive index, for example, a glass tube with a glass layer containing the above-described dopant formed on the inner surface thereof may also be used. The outer periphery of the glass tube may be coated with a water-resistant glass film. The number of optical fibers may be freely determined so long as it is at least two. In the embodiment shown in FIG. 2, the hole 19a from which the gaseous glass material is introduced may be provided at the undersurface of the glass tube 18. Alternatively, the gas may be introduced from one end of the glass tube. In the embodiment shown in FIG. 4, a polymeric gas or liquid may be introduced from the hole 19a and the glass tube 18 may be heated so as to further coat the outer peripheral surface of the glass film 21 with the polymer, thereby increasing the mechanical strength. For example, an ultraviolet curing resin may be introduced to cover the outer peripheral surface of the glass film 21 by ultraviolet-light irradiation or heat energy such as a heater. A certain degree of reinforcing effect is obtained by coating the tapered region with the above-described resin in place of the glass film. When an ultraviolet curing resin or a silicone resin system is introduced, it is introduced from the hole 19a in the state of a liquid (or a gas) to wet the tapered region with the liquid (or blow the gas to the tapered region), thereafter the liquid (or gas) is discharged from the hole 19b, and the tapered region is cured by ultraviolet-light irradiation or by means of a heater to form a polymer film on the outer peripheral surface of the tapered region. If the polymer film is simultaneously formed not only on the tapered region but also on the glass portions and the clad portions of the optical fibers on both sides, it is possible to alleviate the mechanical vibration and shock, thereby enhancing the reliability of the optical star coupler. In order to make a thick film, the viscosity of the liquid is increased or the above-described operation is repeated several times.

The spindle stocks 4a and 4b may be moved in the direction of either 13a or 13b instead of both directions. The optical fiber bundle 5 may also be twisted in the direction of either 14a or 14b instead of both directions. If the burner 8 or 16 is moved in the direction of either 13a or 13b as the spindle stocks 4a and 4b move in the directions 13a or 13b, it is possible to prevent the outer diameter of the central portion of the tapered region from being made small, thereby dividing light equally.

In the embodiment shown in FIG. 4, it is possible to insert a resin in the glass tube 18 so as to alleviate the mechanical vibration and shock.

Figure 5:
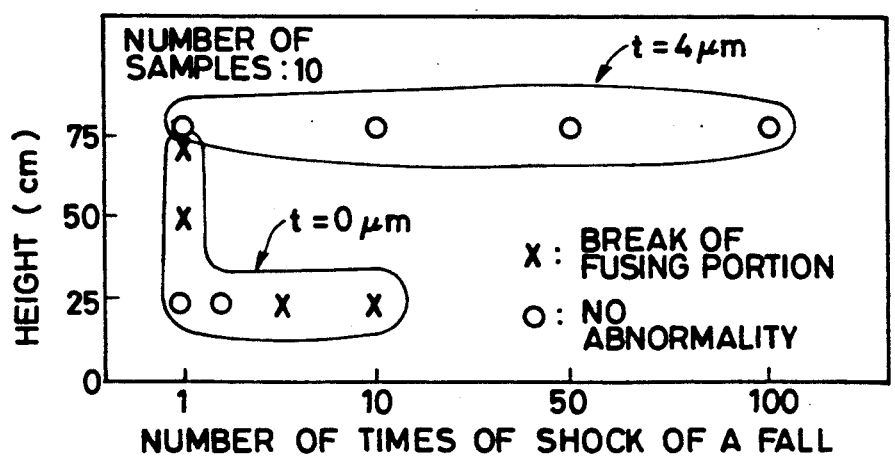
FIG. 5 shows the fall shock characteristic of the optical star coupler.

FIG. 5 shows the fall shock characteristic of a 32×32 port optical star coupler. If the star coupler has no reinforcing film (t=0 μm), when it is dropped onto a wooden plate from a height of 75 cm, the fused portion is broken at one drop test. In contrast, if the star coupler has a reinforcing film of 4 μm thick, 100-time drop tests do not break the fibers. It has been proved that in any test the variance of the insertion loss is as small as ±0.25 dB or less, which means no problem in practical use.

The present invention has the following merits:

(1) Since the outer periphery of the tapered region is coated with a dielectric substance, the mechanical strength of the optical star coupler is increased and handling thereof is facilitated.

(2) Since the outer diameter of the tapered region is large, as described above, the optical star coupler is stable against mechanical vibration and shock.

(3) Since the outer periphery of the tapered region is coated with a dielectric substance, adhesion of impurities to the surface scarcely deteriorates the optical properties, and the radiation loss is reduced, thereby providing an optical star coupler having a small loss.

(4) Since the tapered region is coated with a dielectric substance while it is being formed, the outer diameter of the tapered region as a whole does not become small unlike a conventional one. It is therefore possible to suppress unnecessary deformation of the tapered region due to a flicker of a flame, so that it is possible to produce an optical star coupler without almost any nonuniformity in division. Since it is possible to manufacture optical star couplers with good reproducibility, mass production with a reduced cost is enabled.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An optical star coupler comprising: an optical fiber bundle formed of a plurality of optical fibers, the central portion of said optical fiber bundle being twisted, fused and pulled under heating so as to form a tapered region, and the outer peripheral portion of said tapered region being coated with a dielectric substance.

2. An optical star coupler according to claim 1, wherein said dielectric substance is one of the group comprising glass, a polymer, and a compound thereof.

3. An optical star coupler according to claim 1, wherein the dielectric substance coating forms a cladding on an optical fiber and said dielectric substance has a refractive index that is no greater than the refractive index of the cladding portion of an optical fiber.

4. An optical star coupler according to claim 1, wherein the processed portion of said optical fiber bundle is inserted into a glass container having a U-shaped, V-shaped or semicircle cross section.

5. An optical star coupler according to claim 4, wherein the processed portion of said optical fiber bundle is inserted into a glass container having a cross section selected from the group consisting of U-shaped, V-shaped and semicircular.

6. An optical star coupler according to claim 1, wherein the processed portion of said optical fiber bundle is inserted into a glass tube which is filled with an inert gas and sealed.

7. An optical star coupler according to claim 1, wherein said outer peripheral portion coated with a dielectric substance contains a further coating with a polymer.

8. An optical star coupler according to claim 7, wherein all sides of said outer peripheral portion that are coated with a dielectric substance are further coated with a polymer.

9. An optical star coupler according to claim 1, wherein said dielectric substance is a silicon compound selected from the group consisting of a halide, an alkylate and a hydride.

10. An optical star coupler according to claim 1, wherein said dielectric substance is a silicon compound containing a second compound for controlling a refractive index.

11. An optical star coupler comprising: an optical fiber bundle formed of a plurality of optical fibers, the central portion of said optical fiber bundle being twisted, fused and pulled under heating so as to form a tapered region, and the outer peripheral portion of said tapered region being coated with a resin.

12. An optical star coupler according to claim 11, wherein said resin is a silicone resin.

13. An optical star coupler according to claim 11, wherein said resin is an ultraviolet curing resin.

14. An optical star coupler comprising:
a glass tube;
a plurality of optical fibers suspended in said glass tube, having a twisted, fused and pulled portion at a central portion of said optical fibers;

means for fixing said optical fibers on both ends of said glass tube; and a dielectric substance coating the surface of said twisted, fused and pulled portion of said optical fibers.

15. An optical star coupler comprising:

a glass container;

a plurality of optical fibers suspended in said glass container having a twisted, fused and pulled portion at a central portion of said optical fibers;

means for fixing said optical fibers on both ends of said glass container; and a dielectric substance coating the surface of said twisted, fused and pulled portion of said optical fibers.

* * * * *